(12) United States Patent
Komiyama

(10) Patent No.: US 11,886,859 B2
(45) Date of Patent: Jan. 30, 2024

(54) CONTROL SYSTEM, MOVING OBJECT, CONTROL METHOD, AND COMPUTER-READABLE STORAGE MEDIUM

(71) Applicant: HONDA MOTOR CO., LTD., Tokyo (JP)

(72) Inventor: Yujiro Komiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 17/453,864

(22) Filed: Nov. 8, 2021

(65) Prior Publication Data
US 2022/0206779 A1 Jun. 30, 2022

(30) Foreign Application Priority Data
Dec. 25, 2020 (JP) ................. 2020-216696

(51) Int. Cl.
*G06F 8/65* (2018.01)
*G05B 19/042* (2006.01)

(52) U.S. Cl.
CPC ........... *G06F 8/65* (2013.01); *G05B 19/0426* (2013.01); *G05B 2219/23008* (2013.01)

(58) Field of Classification Search
None
See application file for complete search history.

(56) References Cited

U.S. PATENT DOCUMENTS

| 11,599,097 | B1 * | 3/2023 | Gal | G05B 19/4183 |
| 2013/0138776 | A1 | 5/2013 | Yamashita | |
| 2013/0197712 | A1 | 8/2013 | Matsuura | |
| 2019/0349432 | A1 * | 11/2019 | Kashima | H04B 1/1615 |
| 2020/0065087 | A1 * | 2/2020 | Miura | H04L 67/34 |
| 2021/0191661 | A1 | 6/2021 | Harata | |

(Continued)

FOREIGN PATENT DOCUMENTS

| CN | 101778378 A * | 7/2010 |
| JP | 2005182265 A | 7/2005 |

(Continued)

OTHER PUBLICATIONS

Office Action issued for counterpart Japanese Application No. 2020-216696, issued by the Japanese Patent Office dated Sep. 27, 2022 (drafted on Sep. 22, 2022).

*Primary Examiner* — Philip Wang

(57) ABSTRACT

A control system comprises a first and second moving object control unit for controlling a moving object, an update control unit for controlling reception, from an external apparatus, of a first update program for updating the first moving object control unit and a second update program for updating the second moving object control unit to control updates of the first and second moving object control unit by the first and second update program, and an acquisition unit for acquiring update information indicating an amount of electric power needed to update the first moving object control unit by the first update program and an amount of electric power needed to update the second moving object control unit by the second update program, wherein the update control unit selects, based on the update information, a moving object control unit to be updated among the first and second moving object control unit.

17 Claims, 6 Drawing Sheets

(56) References Cited

U.S. PATENT DOCUMENTS

| | | | |
|---|---|---|---|
| 2021/0349709 A1* | 11/2021 | Nakatsukasa | G06F 8/656 |
| 2021/0403016 A1* | 12/2021 | Jung | G06F 11/1433 |
| 2022/0153164 A1* | 5/2022 | Tasaki | H04L 41/082 |

FOREIGN PATENT DOCUMENTS

| | | | | |
|---|---|---|---|---|
| JP | 2013114499 A | | 6/2013 | |
| JP | 2017134506 A | | 8/2017 | |
| JP | 2019196732 A | | 11/2019 | |
| JP | 2020027666 A | | 2/2020 | |
| JP | 2020135578 A | * | 8/2020 | ............ B60R 16/03 |
| WO | 2012017719 A1 | | 2/2012 | |
| WO | WO-2013051777 A1 | * | 4/2013 | ............... G06F 8/66 |
| WO | 2020003515 A1 | | 1/2020 | |
| WO | WO-2021113305 A1 | * | 6/2021 | .......... G06F 11/1433 |

\* cited by examiner

| ID | CURRENT VALUE [A] | UPDATE TIME [m] |
|---|---|---|
| E001 | A1 | T1 |
| E002 | A2 | T2 |
| . | . | . |
| . | . | . |
| . | . | . |

CONTROL SYSTEM, MOVING OBJECT, CONTROL METHOD, AND COMPUTER-READABLE STORAGE MEDIUM

The contents of the following Japanese patent application are incorporated herein by reference:

Japanese Patent Application NO. 2020-216696 filed on Dec. 25, 2020.

BACKGROUND

1. Technical Field

The present invention relates to a control system, a moving object, a control method, and a computer-readable storage medium.

2. Related Art

Patent document 1 discloses an ECU capable of rewriting an application program as an ECU for a vehicle.

PRIOR ART DOCUMENT

Patent Document

Patent document 1: Japanese Patent Application Publication No. 2020-27666

BRIEF DESCRIPTION OF THE DRAWINGS

FIG. 3 illustrates the data structure of discharge amount information managed by an update package generator 72 in a tabulated form.

DESCRIPTION OF EXEMPLARY EMBODIMENTS

Hereinafter, the present invention will be described through embodiments of the invention, but the following embodiments do not limit the claimed invention. In addition, not all combinations of features described in the embodiments necessarily are essential to solving means of the invention.

Figure 1:
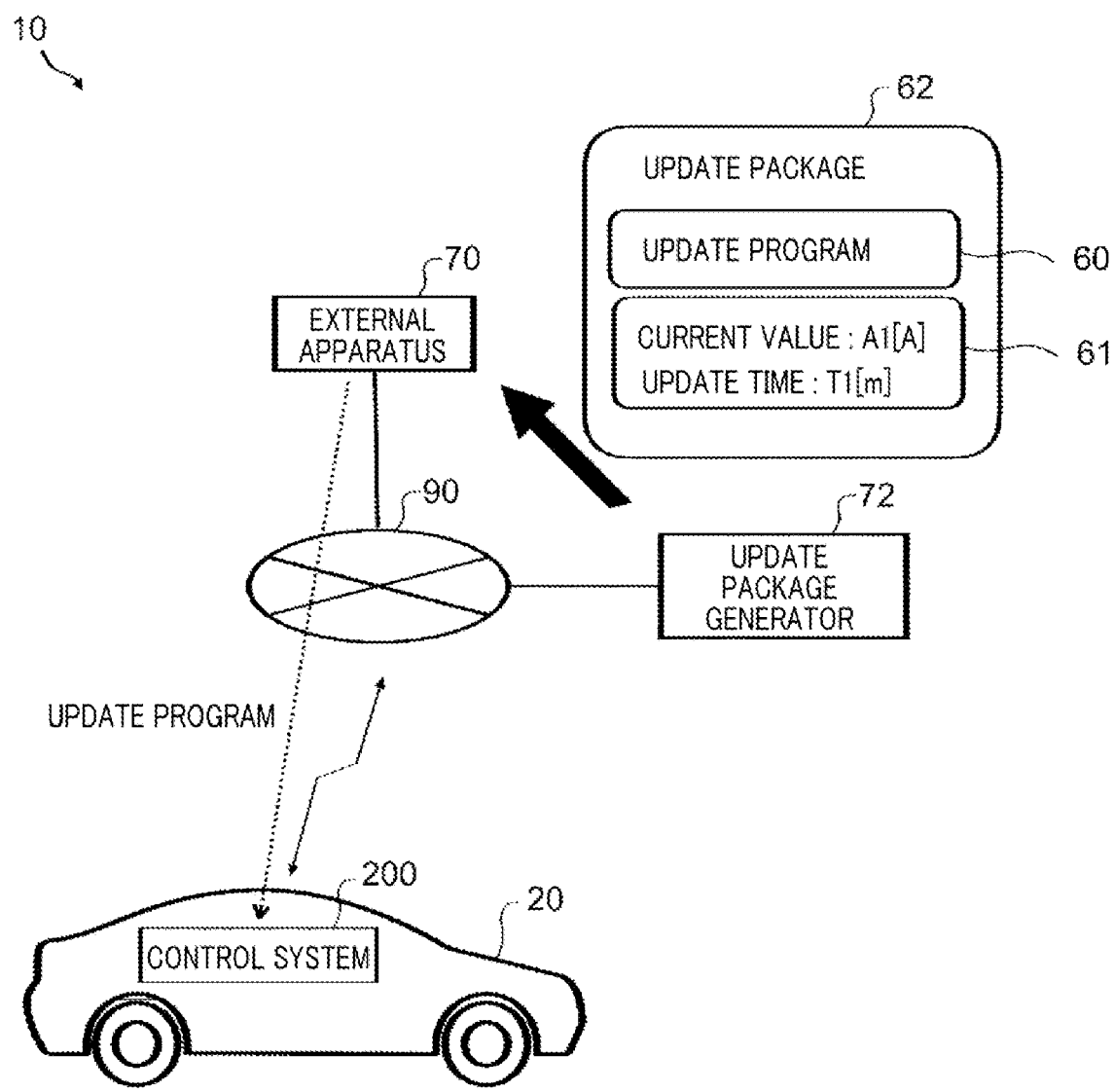
FIG. 1 schematically illustrates an update system 10 according to one embodiment.

FIG. 1 schematically illustrates an update system 10 according to one embodiment. The update system 10 comprises a vehicle 20, an external apparatus 70, and an update package generator 72. The vehicle 20 comprises a control system 200. The control system 200 is responsible for control of the vehicle 20 and communication with the external apparatus 70 via a communication network 90. The communication network 90 includes an IP network such as the Internet, a P2P network, a dedicated line including VPN, a virtual network, a mobile communication network or the like.

In the vehicle 20, the control system 200 comprises a plurality of ECUs (electronic control units) configured to perform control of the vehicle 20. The control system 200 acquires update programs for the ECUs provided on the control system 200 from the outside. For example, the control system 200 receives, via wireless communication, update programs 60 sent from an external apparatus 70 through the communication network 90. The control system 200 reprograms the ECUs provided on the control system 200 by the update programs 60. The reprogramming is performed for the purpose of upgrading functionalities of the ECUs provided on the control system 200 or the like. In this manner, the control system 200 updates the ECUs by reprogramming the ECUs in an OTA (over the air) manner. In the present embodiment, updating equipment such as the ECUs by an update program is referred to as a "program update".

The program update of the ECUs is performed when the ignition (IG) switch of the vehicle 20 is turned off. The program update of the ECUs is performed using electric power of a battery provided in the vehicle 20. The update package generator 72 associates update information 61 including a current value and an update time with the update programs 60. The current value is a current value needed to be supplied from the battery to perform the program update by the update programs 60. The update time is a time needed to execute the program update by the update programs 60. The update package generator 72 uploads an update package 62 to the external apparatus 70 through the communication network 90.

In a case where a plurality of update programs for the vehicle 20 exists, the external apparatus 70 sends update information for each update program to the vehicle 20. The control system 200 calculates an amount of electricity needed for the program update of each ECU based on the update information received from the external apparatus 70. The control system 200 determines, from the remaining capacity of the battery provided in the vehicle 20, the amount of electricity that can be released from the battery. The control system 200 selects, based on the amount of electricity that can be supplied from the battery and the amount of electricity needed for the program update for each ECU, the ECUs for which the program update is to be performed, such that the sum value of the amount of electricity needed for the program update becomes less than or equal to the amount of electricity that can be supplied from the battery. The control system 200 downloads the update programs for updating the selected ECUs from the external apparatus 70 to perform the program update for the ECUs.

According to the update system 10, the ECUs for which the program update is to be performed can be selected in such a range where over-discharge of the battery does not occur. Therefore, the possibility of over-discharge of the battery during the program update can be suppressed. In addition, the program update can be performed for as many ECUs as possible in a range within the discharge capacity that can be supplied from the battery. In this way, important update programs can be applied to the vehicle 20 sooner.

Figure 2:
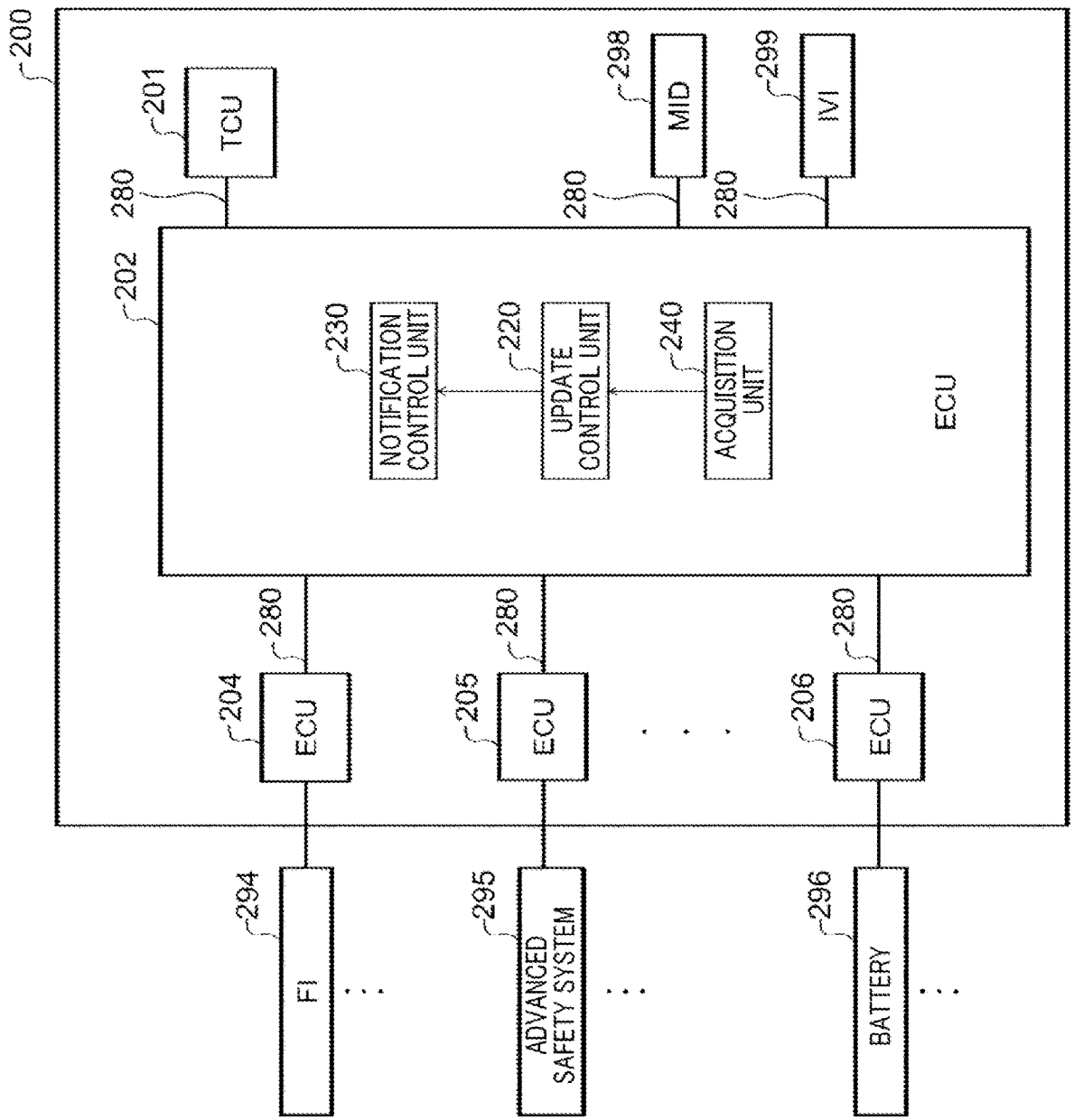
FIG. 2 schematically illustrates a system configuration provided for a control system 200.

FIG. 2 schematically illustrates a system configuration provided for a control system 200. The control system 200 comprises a TCU 201, an ECU 202, an ECU 204, an ECU 205, an ECU 206, an MID 298, and an IVI 299. In FIG. 2, an FI 294, an advanced safety system 295 and a battery 296 are examples of controlled equipment in the vehicle 20.

The ECU 202 is connected to the TCU 201, the ECU 204, the ECU 205 and the ECU 206 through an in-vehicle communication line 280. The ECU 202 mutually communicates with the TCU 201, the ECU 204, the ECU 205, the ECU 206, the MID 298, and the IVI 299 through the in-vehicle communication line 280. The ECU 202 integrates and controls the TCU 201, the ECU 204, the ECU 205, the ECU 206, the MID 298, and the IVI 299. The in-vehicle communication line 280 may be configured to include a CAN (controller area network), ether network, or the like, for example.

The TCU 201 is a telematics control unit. The TCU 201 is mainly responsible for mobile communication. The TCU 201 performs transmission and reception of data with the external apparatus 70, based on control by the ECU 202. The TCU 201 receives the update programs sent from the external apparatus 70 through mobile communication, based on control by the ECU 202. The TCU 201 may function as a wireless communication unit.

The MID 298 is a multi-information display. The IVI 299 is an in-vehicle infotainment information equipment (IVI), for example. The MID 298 and the IVI 299 may each function as a display control unit. The IVI 299 comprises a wireless LAN communication function. The IVI 299 receives the update programs sent from the external apparatus 70 through wireless LAN communication, based on control by the ECU 202.

The ECU 204, the ECU 205, and the ECU 206 are each an ECU that serves as a vehicle control unit for controlling the vehicle 20. The ECU 204, the ECU 205, and the ECU 206 are examples of the "moving object control unit". The ECU 204, the ECU 205, and the ECU 206 each control various equipment provided on the vehicle 20. For example, the ECU 204 controls the FI 294 which is a fuel injection apparatus, or the like. The ECU 205 controls the advanced safety system 295 or the like. The advanced safety system 295 is, for example, a battery that accumulates electric power to be supplied to a drive motor provided on the vehicle 20. The ECU 206 controls the battery 296 or the like. The battery 296 functions as a 12 V power supply of the vehicle, for example. The battery 296 is, for example, a lead storage battery or the like.

In the present embodiment, a system configuration in which the control system 200 comprises the TCU 201, the ECU 202, the ECU 204, the ECU 205, the ECU 206, the MID 298, and the IVI 299 is illustrated, but the system configuration of the control system 200 is not limited to the example of the present embodiment. In addition, in the present embodiment, as an example, the ECU 204 and the ECU 205 are described as the moving object control units that could be targeted for the program update, and the ECU 202 is described to function as the update control unit for controlling the program update. Note that, the moving object control units that could be targeted for the program update is not limited to these ECUs. The moving object control units that could be targeted for the program update may be any of the TCU 201, the ECU 202, the ECU 204, the ECU 205, the ECU 206, the MID 298, and the IVI 299.

The ECU 202 comprises an update control unit 220, a notification control unit 230, and an acquisition unit 240.

The update control unit 220 controls reception from the external apparatus 70 of a first update program for updating the ECU 204 and a second update program for updating the ECU 205, and controls the update of the ECU 204 and the ECU 205 by the first update program and the second update program. The acquisition unit 240 acquires update information indicating an amount of electric power needed to update the ECU 204 by the first update program and an amount of electric power needed to update the ECU 205 by the second update program. For example, the acquisition unit 240 acquires the update information sent from the external apparatus 70. The update control unit 220 selects the ECU to be updated among the ECU 204 and the ECU 205 based on the update information.

Note that, in the present embodiment, it is assumed that the program update of the ECU is performed with a 12 V battery as the power supply. That is, it is assumed that the power supply voltage for the program update is fixed at 12 V. Therefore, in the present embodiment, the electric power needed to update the ECU is represented with a current value, and the amount of electric power needed to update the ECU is represented with the amount of electricity that can be released from the 12 V battery (discharge capacity).

For example, the update control unit 220 selects the ECU to be updated among the ECU 204 and the ECU 205 based on the amount of electric power that can be supplied from the battery 296 provided on the vehicle 20 and the update information. The amount of electric power that can be supplied from the battery 296 provided on the vehicle 20 may be the amount of electric power that is pre-reserved for performing update by the update control unit 220 in the battery 296.

The update control unit 220 may calculate the first amount of electric power needed to update the ECU 204 and the second amount of electric power needed to update the ECU 205 based on the update information, and select, based on the first amount of electric power and the second amount of electric power, the ECU to be updated among the ECU 204 and the ECU 205 such that the amount of electric power needed to perform update by the update control unit 220 is less than or equal to the amount of electric power that can be supplied from the battery 296 provided on the vehicle 20.

The notification control unit 230 may cause user notification regarding auxiliary charge of the battery 296 to be performed in a case where the update control unit 220 did not select at least one of the ECU 204 and the ECU 205 as the ECU to be updated. The user is a passenger of the vehicle 20, for example. For example, the notification control unit 230 may cause the MID 298 and the IVI 299 to perform the user notification.

The acquisition unit 240 may acquire importance information indicating the importance of an update of each of the ECU 204 and the ECU 205. The notification control unit 230 may cause user notification regarding auxiliary charge of the battery 296 to be performed in a case where priority of an update of the ECU, among the ECU 204 and the ECU 205, that was not selected by the update control unit 220 as the ECU to be updated is higher than a predetermined value.

The update information may be information indicating electric power and update time needed to update the ECU 204 by the first update program and electric power and update time needed to update the ECU 205 by the second update program. The update control unit 220 may calculate the time needed to update the ECU 204 and the time needed to update the ECU 205 based on the update information, and select the ECU to be updated among the ECU 204 and the ECU 205 such that the time needed to update the moving object control unit to be updated is less than or equal to an allowed time for which the update by the update control unit 220 is allowed to be performed.

Here, the program update will be described. A program update processing in a case where the equipment targeted for the program update is the ECU and the memory for storing firmware of the ECU is a single-bank memory (a so-called one side ROM) is described. In this case, since the number of the program storage areas for storing firmware of the ECU is one, an update program cannot be written in the program storage area when the ECU is operated according to the program stored in the program storage area. In a case where a program update of the ECU is to be performed, the update control unit 220 instructs the ECU to perform the program update after causing the ECU to transfer the update program and to store the update program in a predetermined data storage area in the ECU. When instructed to perform the program update, the ECU executes a control code for performing the program update, writes the update program transferred to the data storage area in the program storage area, and activates the update program. Activation of the update program includes a process of setting a startup parameter of the ECU such that the update program is loaded and a control based on the update program is started at the time of startup of the ECU, for example.

Next, a program update processing in a case where an internal memory of the ECU is a double-bank memory (a so-called two-side ROM) will be described. In this case, since the ECU comprises two program storage areas for storing firmware, the update program can be written in the second program storage area when the ECU is operated according to a program stored in the first program storage area. That is, the update program can be written in the second program storage area which is on the backside, by a so-called backside writing. Therefore, even when the vehicle 20 is in motion, for example, the update program can be written in the second program storage area. Therefore, the update control unit 220 transfers the update program to the ECU, and then instructs the ECU to write the update program in the second program storage area. After writing of the update program in the second program storage area of the ECU is complete, the program update of the ECU is enabled. In a case where the update control unit 220 performs the program update of the ECU, the update control unit 220 instructs the ECU to activate the update program written in the second program storage area. Activation of the update program includes a process of setting a startup parameter of the ECU such that the update program stored in the second program storage area is loaded and a control based on the update program is started at the time of startup of the ECU, for example. For example, the activation of the update program includes a process of activating the second program storage area as a reading area for the program, as well as deactivating the first program storage area as the reading area for the program. In this manner, the "program update" is a concept which includes instructing writing of the update program in the program storage area of the ECU. In addition, the "program update" is a concept which includes instructing activation of the update program written in the program storage area.

In the present embodiment, description is made assuming that the internal memory of the ECU 204 to be updated is a single-bank memory, and the internal memory of the ECU 205 is a double-bank memory.

FIG. 3 illustrates the data structure of discharge amount information managed by a update package generator 72 in a tabulated form. The discharge amount information includes an ID, a current value, and an update time. The ID is information indicating the type of the ECU. The current value indicates the current value needed for the program update of the ECU. The unit for the current value is ampere, for example. The update time indicates the time needed for the program update of the ECU. As one example, in a case where a program update is performed for an ECU with a type identified by E001, the amount of electricity needed for the program update is calculated by A1×T1. Note that, description is made assuming that E001 in FIG. 3 represents the type of the ECU 204, and E002 represents the type of the ECU 205.

When newly registering an update program in the external apparatus 70, the update package generator 72 refers to the discharge amount information to generate the update information including the current value and the update time associated with the type of the ECU targeted for the program update by the update program. In addition, the update package generator 72 includes importance information indicating the importance of the update program in the update information. The update package generator 72 registers the generated update information in the external apparatus 70 in association with the update program.

Figure 4:
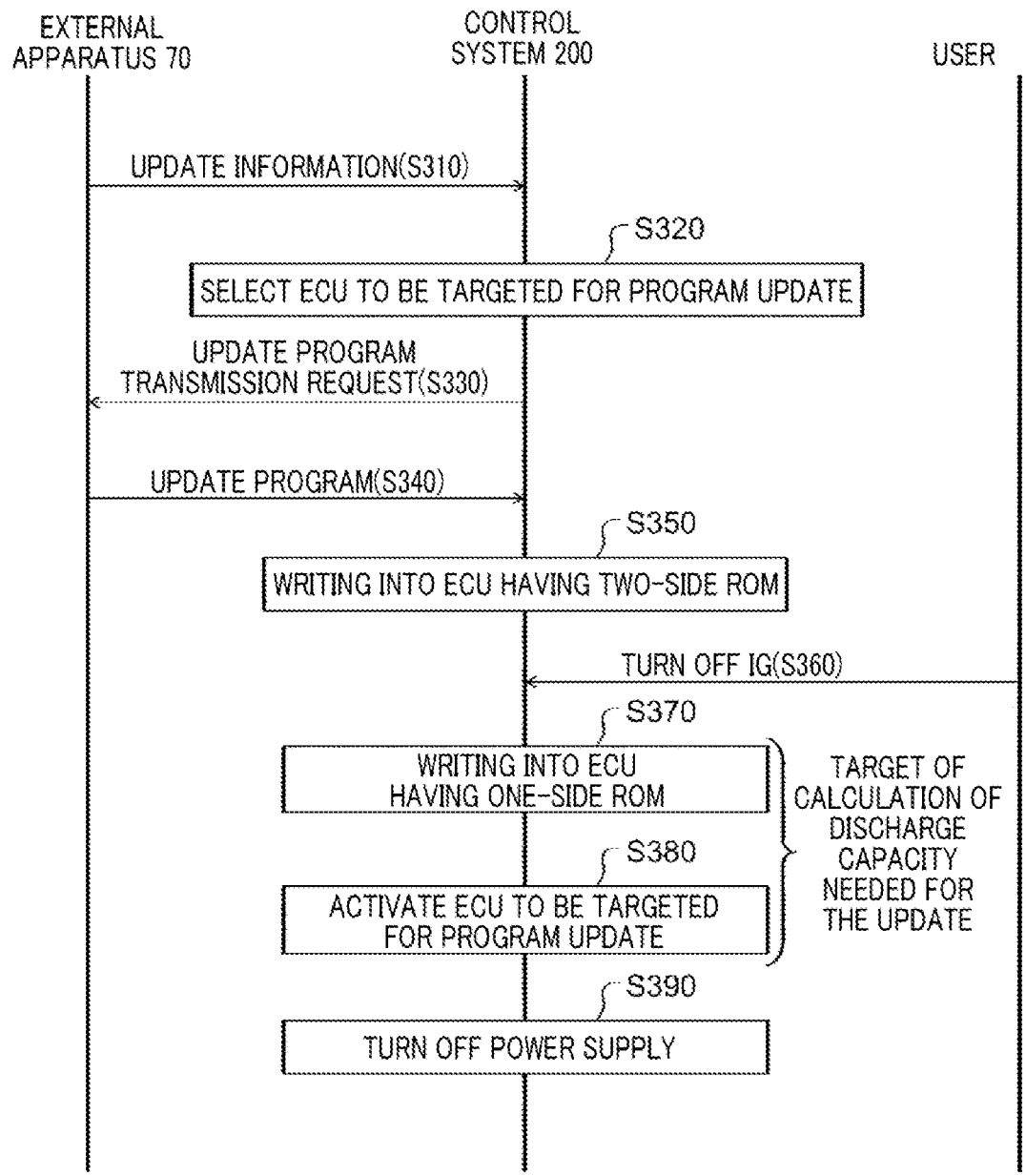
FIG. 4 illustrates an execution sequence related to a program update processing.

FIG. 4 illustrates an execution sequence related to a program update processing. At S310, in a case where an update program to be applied to an ECU of the control system 200 in the vehicle 20 exists, the external apparatus 70 sends update information associated with the update program to the control system 200. The acquisition unit 240 acquires the update information sent from the external apparatus 70. Here, it is assumed that a plurality of ECUs to be updated by the update program exists.

At S320, the update control unit 220 selects one or more ECUs to be targeted for the program update, among the plurality of ECUs. The update control unit 220 selects one or more ECUs for which the program update can be performed, based on the update information and the remaining capacity of the battery 296. For details of the processing at S320, description is made with reference to FIG. 5. Note that, here, a case where the ECU 205 having an internal memory which is a two-side memory ROM and the ECU 204 having an internal memory which is a one-side ROM are selected as the ECUs to be updated is described.

At S330, the update control unit 220 sends, to the external apparatus 70, an update program transmission request for requesting transmission of update programs for the ECUs selected at S320. For example, the update control unit 220 sends an update program transmission request through the TCU 201 or the WI 299.

At S340, the update control unit 220 acquires an update program sent from the external apparatus 70. At S350, the update control unit 220 transfers the update program for the ECU 205 having an internal memory that is a two-side ROM to the ECU 205, and instructs it to write the update program in the program storage area on the backside. After writing of the update program to the program storage area on the backside is complete, activation of the update program of the ECU 205 is enabled.

When the IG switch is turned off at S360, at S370, the update control unit 220 transfers an update program to the ECU 204 having an internal memory that is a one-side ROM, and instructs it to write the update program to the program storage area of the ECU 204. After writing of the update program to the program storage area is complete, activation of the update program of the ECU 204 is enabled.

At S380, the update control unit 220 instructs the ECU 204 and the ECU 205 to activate their respective update programs. At S390, the update control unit 220 turns the power supply of the vehicle 20 to an off state.

In the present embodiment, in a case where the ECU targeted for the program update is selected at S320, the update control unit 220 calculates the discharge capacity needed to perform the process of S370 and S380. That is, the update control unit 220 calculates, as the discharge capacity needed to perform the program update, the sum value of the discharge capacity needed for the duration of performing writing in the program storage area of the ECUs having an internal memory that is a one-side ROM and the duration of activation of the update programs for all of the ECUs to be updated.

Figure 5:
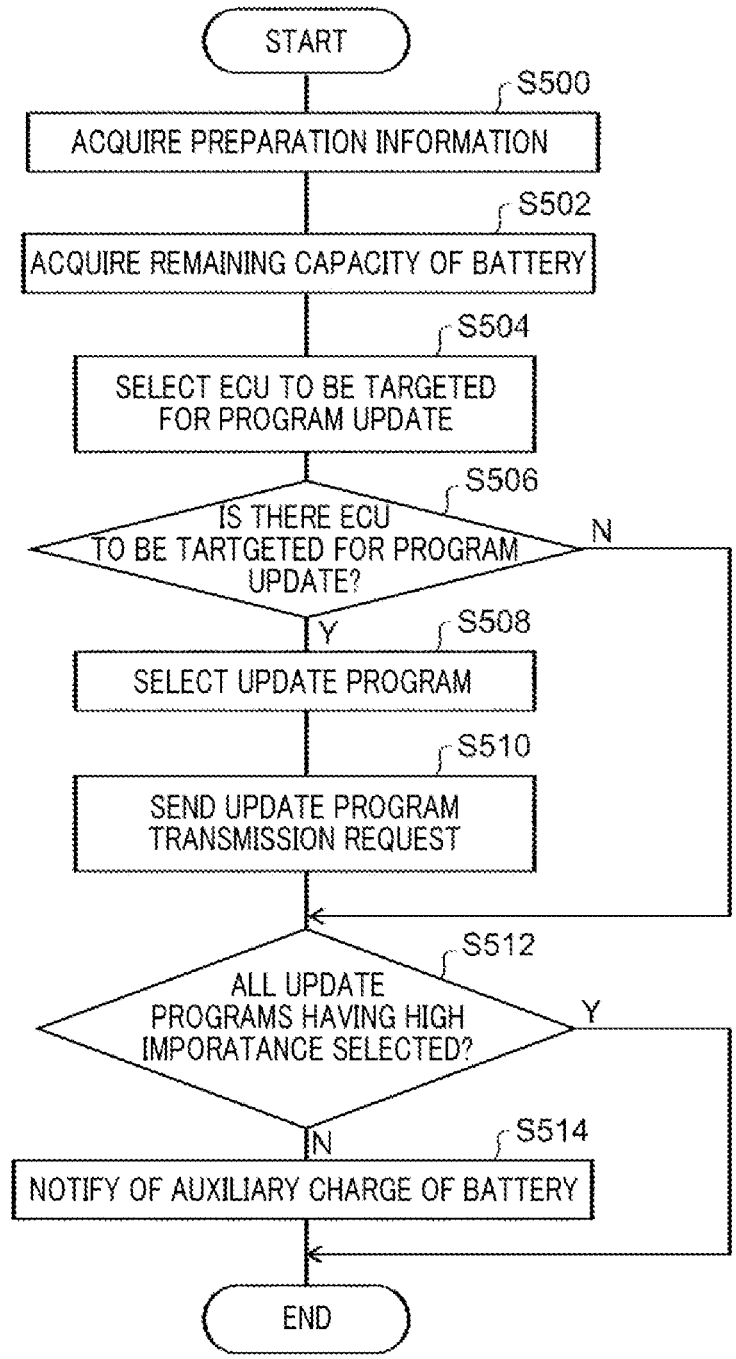
FIG. 5 is a flowchart illustrating the execution procedure of the processing when update information is received.

FIG. 5 is a flowchart illustrating the execution procedure of the processing when update information is received. The processes of the flowchart in FIG. 5 correspond to the processes of S320 and S330 in FIG. 4. At S500, the acquisition unit 240 acquires preparation information sent from the external apparatus 70. At S502, the update control unit 220 acquires the remaining capacity of the battery 296.

At S504, ECUs targeted for the program update is selected. Specifically, the update control unit 220 calculates the amount of electricity needed for the program update of each ECU based on the update information. For example, the update control unit 220 calculates the amount of electricity Q1 needed for the program update of the ECU 204 by Q1=A1×T1, and calculates the amount of electricity Q2 needed for the program update of the ECU 205 by Q2=A2×T2.

The update control unit 220 selects the ECUs to be updated such that the total amount of electricity needed for the program update of the ECUs to be updated is less than or equal to a reference value and the sum value of the time needed for the program update of the ECUs to be updated is less than or equal to a reference value. Note that, the reference value of the amount of electricity may be an amount of electricity reserved for the program update in the battery 296. Note that, the reference value of the amount of electricity needed for the program update may be set according to the usage period of the battery 296. The reference value of the time needed for the program update may be a predetermined fixed value. For example, the reference value of the time needed for the program update may be ten minutes.

At S506, it is determined whether one or more ECUs to be targeted for the program update have been selected. In a case where one or more ECUs to be targeted for the program update are selected, the update control unit 220 selects the update program for the ECUs selected at S504 (S508), and sends, to the external apparatus 70, an update program transmission request to transmit the selected update program (S510).

At S512, the notification control unit 230 determines whether all of the update programs having importance that is higher than the predetermined value have been selected by referring to the update information. In a case where all the update programs having importance that is higher than the predetermined value have been selected, the process of this flowchart ends. If at least one of the update programs having importance that is higher than the predetermined value could not be selected, at S514, the notification control unit 230 causes the IVI 299 to display user notification indicating that auxiliary charge of the battery is needed, and ends the process of this flowchart.

With the update system 10 according to the present embodiment, ECUs for which the program update is to be performed can be selected such that over-discharge of the battery does not occur. Therefore, the possibility of over-discharge of the battery during the program update can be suppressed. In addition, the program update can be performed for as many ECUs as possible in a range within the discharge capacity that can be supplied from the battery. In this way, important update programs can be applied to the control system 200 sooner.

Note that, the vehicle 20 is a vehicle as one example of transport equipment. The vehicle may be a vehicle such as a motor vehicle comprising an internal combustion engine, an electric vehicle, fuel cell vehicle (FCV). The motor vehicle includes a bus, a truck, a two-wheeled vehicle, or the like. The vehicle may be a saddle-type vehicle and the like, or may be a motorcycle. Transport equipment, includes, other than a vehicle, equipment such as an aircraft including an unmanned aircraft or a watercraft. The transport equipment may be any equipment for transporting people or articles. The transport equipment is one example of the moving object The moving object is not limited to the transport equipment, and may be any equipment capable of moving.

Figure 6:
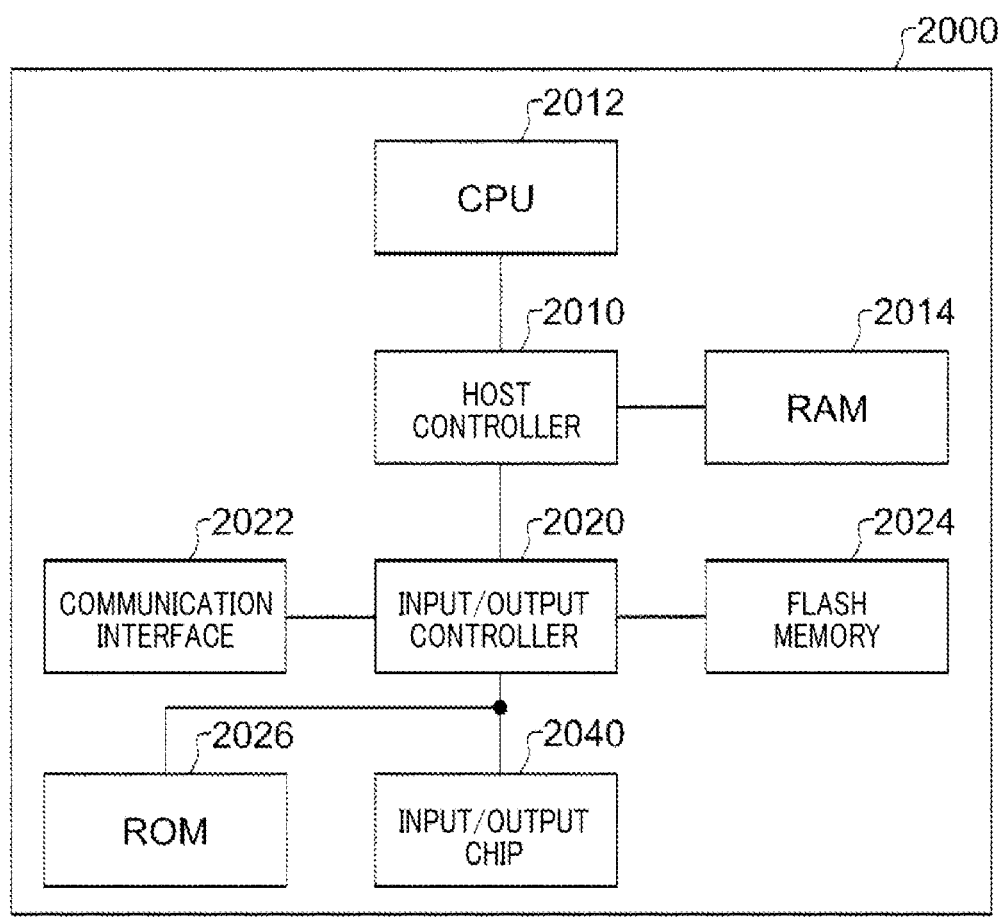
FIG. 6 illustrates an example of a computer 2000.

FIG. 6 illustrates an example of a computer 2000 in which a plurality of embodiments of the present invention can be entirely or partially embodied. A program installed on the computer 2000 can cause the computer 2000 to function as a system such as the control system according to the embodiments or each unit thereof, to perform operations associated with the system or each unit thereof, and/or to perform the process according to the embodiments or steps thereof. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014, or the ROM 2026, and is executed by the CPU 2012. Information processing written in these programs is read by the computer 2000, resulting in cooperation between a program and the above-mentioned various types of hardware resources. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and perform various types of processing on the data on the RAM 2014. The CPU 2012 then writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgment, conditional branching, unconditional branching, information retrieval and replacement, or the like described herein and specified by instruction sequences of the programs, and write back a result into the RAM 2014. In addition, the CPU 2012 may search for information in a file, a database, or the like in the recording medium. For example, when a plurality of entries, each having an attribute value of a first attribute associated with an attribute value of a second attribute, is stored in the recording medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

A program or a software module described above may be stored in a computer-readable storage medium on the computer 2000 or in proximity to the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

The program installed on the computer 2000 and causes the computer 2000 to function as the control system 200 may work on the CPU 2012 or the like to cause the computer 2000 to function as each unit of the control system 200, respectively. Information processing written in these programs is read by the computer 2000, thereby functioning as each unit of the control system 200 which is specific means in which a software and various hardware resources described above cooperate with each other. By implementing operations or processing of information according to the intended use of the computer 2000 in the present embodiment using these specific means, a control system 200 specific to the intended use is constructed.

Various embodiments have been described with reference to the block diagrams and the like. In the block diagrams, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer-readable storage medium may include any tangible device capable of storing an instruction executed by an appropriate device. As a result, the computer-readable storage medium having the instruction stored thereon constitutes at least a part of a product including an instruction that may be executed in order to provide a means to execute an operation specified by a processing procedure or a block diagram. Examples of computer-readable storage media may include an electronic storage medium, a magnetic storage medium, an optical storage medium, an electromagnetic storage medium, a semiconductor storage medium, etc. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

The computer-readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general purpose computer, a special purpose computer, or other programmable data processing apparatus, or to programmable circuit, locally or via a local area network (LAN), wide area network (WAN) such as the Internet, and a computer-readable instruction may be executed to provide means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: update system
20: vehicle
60: update program
61: update information
62: update package
70: external apparatus
72: update package generator
90: communication network
200: control system
201: TCU
202: ECU
204: ECU
205: ECU
206: ECU
220: update control unit
230: notification control unit
240: acquisition unit
280: in-vehicle communication line
294: FI
295: advanced safety system
296: battery
298: MID
299: IVI
2000: computer
2010: host controller
2012: CPU
2014: RAM
2020: input/output controller
2022: communication interface
2024: flash memory
2026: ROM
2040: input/output chip

What is claimed is:

1. A control system comprising:
a first moving object control unit and a second moving object control unit configured to control a moving object;
an update control unit configured to control reception, from an external apparatus, of a first update program for updating the first moving object control unit and a second update program for updating the second moving object control unit to control updates of the first moving object control unit and the second moving object control unit by the first update program and the second update program; and
an acquisition unit configured to acquire update information including an amount of electric power needed to update the first moving object control unit by the first update program and an amount of electric power needed to update the second moving object control unit by the second update program,
wherein the acquisition unit is configured to acquire the update information sent from the external apparatus, and
wherein the update control unit is configured to select, based on the update information, a moving object control unit to be updated among the first moving object control unit and the second moving object control unit, the acquisition unit is configured to acquire importance information indicating importance of an update of each of the first moving object control unit and the second moving object control unit, and
the control system further comprises a notification control unit configured to cause user notification regarding auxiliary charge of the battery to be performed in a case where priority of an update of a moving object control unit, among the first moving object control unit and the second moving object control unit, that was not selected by the update control unit as a moving object control unit to be updated is higher than a predetermined value.

2. The control system according to claim 1, wherein
the update control unit is configured to select, based on an amount of electric power that can be supplied from a battery provided on the moving object and the update information, a moving object control unit to be updated among the first moving object control unit and the second moving object control unit.

3. The control system according to claim 2, wherein
the amount of electric power that can be supplied from the battery provided on the moving object is an amount of electric power that is pre-reserved for performing update by the update control unit in the battery.

4. The control system according to claim 3, wherein
the update control unit is configured to calculate a first amount of electric power that is needed to update the first moving object control unit and a second amount of electric power needed to update the second moving object control unit based on the update information, and select, based on the first amount of electric power and the second amount of electric power, a moving object control unit to be updated among the first moving object control unit and the second moving object control unit, such that the amount of electric power needed to perform update by the update control unit is less than or equal to the amount of electric power that can be supplied from the battery provided on the moving object.

5. The control system according to claim 3, wherein
the update information indicates electric power and update time needed to update the first moving object control unit by the first update program and electric power and update time needed to update the second moving object control unit by the second update program.

6. The control system according to claim 5, wherein
the update control unit is configured to calculate, based on the update information, a time needed to update the first moving object control unit and a time needed to update the second moving object control unit, and select a moving object control unit to be updated among the first moving object control unit and the second moving object control unit such that the time needed to update the moving object control unit to be updated is less than or equal to an allowed time for which the update by the update control unit is allowed to be performed.

7. The control system according to claim 2, wherein
the update control unit is configured to calculate a first amount of electric power that is needed to update the first moving object control unit and a second amount of electric power needed to update the second moving object control unit based on the update information, and select, based on the first amount of electric power and the second amount of electric power, a moving object control unit to be updated among the first moving object control unit and the second moving object control unit, such that the amount of electric power needed to perform update by the update control unit is less than or equal to the amount of electric power that can be supplied from the battery provided on the moving object.

8. The control system according to claim 7, wherein the update information indicates electric power and update time needed to update the first moving object control unit by the first update program and electric power and update time needed to update the second moving object control unit by the second update program.

9. The control system according to claim 2, wherein the update information indicates electric power and update time needed to update the first moving object control unit by the first update program and electric power and update time needed to update the second moving object control unit by the second update program.

10. The control system according to claim 1, wherein the update information indicates electric power and update time needed to update the first moving object control unit by the first update program and electric power and update time needed to update the second moving object control unit by the second update program.

11. The control system according to claim 10, wherein the update control unit is configured to calculate, based on the update information, a time needed to update the first moving object control unit and a time needed to update the second moving object control unit, and select a moving object control unit to be updated among the first moving object control unit and the second moving object control unit such that the time needed to update the moving object control unit to be updated is less than or equal to an allowed time for which the update by the update control unit is allowed to be performed.

12. A moving object comprising the control system according to claim 1.

13. The moving object according to claim 12, wherein the moving object is a vehicle.

14. A control system comprising:
a first moving object control unit and a second moving object control unit configured to control a moving object;
an update control unit configured to control reception, from an external apparatus, of a first update program for updating the first moving object control unit and a second update program for updating the second moving object control unit to control updates of the first moving object control unit and the second moving object control unit by the first update program and the second update program; and
an acquisition unit configured to acquire update information indicating an amount of electric power needed to update the first moving object control unit by the first update program and an amount of electric power needed to update the second moving object control unit by the second update program,
wherein the update control unit is configured to select, based on the update information, a moving object control unit to be updated among the first moving object control unit and the second moving object control unit,
the acquisition unit is configured to acquire importance information indicating importance of an update of each of the first moving object control unit and the second moving object control unit, and
the control system further comprises a notification control unit configured to cause user notification regarding auxiliary charge of the battery to be performed in a case where priority of an update of a moving object control unit, among the first moving object control unit and the second moving object control unit, that was not selected by the update control unit as a moving object control unit to be updated is higher than a predetermined value.

15. A control system comprising:
a first moving object control unit and a second moving object control unit configured to control a moving object;
an update control unit configured to control reception, from an external apparatus, of a first update program for updating the first moving object control unit and a second update program for updating the second moving object control unit to control updates of the first moving object control unit and the second moving object control unit by the first update program and the second update program; and
an acquisition unit configured to acquire update information indicating an amount of electric power needed to update the first moving object control unit by the first update program and an amount of electric power needed to update the second moving object control unit by the second update program,
wherein the update control unit is configured to select, based on the update information, a moving object control unit to be updated among the first moving object control unit and the second moving object control unit, and
the update control unit is configured to calculate, based on the update information, a time needed to update the first moving object control unit and a time needed to update the second moving object control unit, and select a moving object control unit to be updated among the first moving object control unit and the second moving object control unit such that the time needed to update the moving object control unit to be updated is less than or equal to an allowed time for which the update by the update control unit is allowed to be performed.

16. A control method comprising:
controlling reception, from an external apparatus, of a first update program for updating a first moving object control unit configured to control a moving object and a second update program for updating a second moving object control unit configured to control the moving object;
acquiring update information including an amount of electric power needed to update the first moving object control unit by the first update program and an amount of electric power needed to update the second moving object control unit by the second update program, the update information being sent from the external apparatus;
selecting, based on the update information, a moving object control unit to be updated among the first moving object control unit and the second moving object control unit; and
controlling an update of the selected moving object control unit, wherein the control method further comprises acquiring importance information indicating importance of an update of each of the first moving object control unit and the second moving object control unit, and causing user notification regarding auxiliary charge of the battery to be performed in a case where priority of an update of a moving object control unit, among the first moving object control unit and the second moving object control unit, that was not selected as a moving object control unit to be updated is higher than a predetermined value.

17. A non-transitory computer-readable storage medium having stored there on a program that causes a computer to function as:
   a first moving object control unit and a second moving object control unit configured to control a moving object;
   an update control unit configured to control reception, from an external apparatus, of a first update program for updating the first moving object control unit and a second update program for updating the second moving object control unit to control updates of the first moving object control unit and the second moving object control unit by the first update program and the second update program; and
   an acquisition unit configured to acquire update information including an amount of electric power needed to update the first moving object control unit by the first update program and an amount of electric power needed to update the second moving object control unit by the second update program,
   wherein the acquisition unit is configured to acquire the update information sent from the external apparatus, and
   wherein the program causes the update control unit to select a moving object control unit to be updated among the first moving object control unit and the second moving object control unit based on the update information,
   the acquisition unit is configured to acquire importance information indicating importance of an update of each of the first moving object control unit and the second moving object control unit, and
   the program further causes the computer to function as a notification control unit configured to cause user notification regarding auxiliary charge of the battery to be performed in a case where priority of an update of a moving object control unit, among the first moving object control unit and the second moving object control unit, that was not selected by the update control unit as a moving object control unit to be updated is higher than a predetermined value.

* * * * *